United States Patent
Choi et al.

(10) Patent No.: US 10,216,655 B2
(45) Date of Patent: Feb. 26, 2019

(54) MEMORY EXPANSION APPARATUS INCLUDES CPU-SIDE PROTOCOL PROCESSOR CONNECTED THROUGH PARALLEL INTERFACE TO MEMORY-SIDE PROTOCOL PROCESSOR CONNECTED THROUGH SERIAL LINK

(71) Applicant: ELECTRONICS AND TELECOMMUNICATIONS RESEARCH INSTITUTE, Daejeon (KR)

(72) Inventors: Yong Seok Choi, Daejeon (KR); Hyuk Je Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 263 days.

(21) Appl. No.: 15/194,407

(22) Filed: Jun. 27, 2016

(65) Prior Publication Data

US 2017/0255574 A1 Sep. 7, 2017

(30) Foreign Application Priority Data

Mar. 2, 2016 (KR) .................. 10-2016-0025224

(51) Int. Cl.
| | | |
|---|---|---|
| G06F 13/00 | (2006.01) | |
| G06F 13/16 | (2006.01) | |
| G06F 13/40 | (2006.01) | |
| G06F 13/42 | (2006.01) | |
| G06F 12/0813 | (2016.01) | |

(52) U.S. Cl.
CPC ...... *G06F 13/1673* (2013.01); *G06F 13/4063* (2013.01); *G06F 13/4282* (2013.01); *G06F 12/0813* (2013.01)

(58) Field of Classification Search
CPC .................. G06F 13/1673; G06F 12/0813
See application file for complete search history.

(56) References Cited

U.S. PATENT DOCUMENTS

| | | | |
|---|---|---|---|
| 6,112,287 A * | 8/2000 | Litaize | G06F 12/0813 712/11 |
| 7,652,922 B2 | 1/2010 | Kim et al. | |
| 7,719,892 B2 | 5/2010 | Kim et al. | |
| 8,000,144 B2 | 8/2011 | Kim et al. | |
| 8,165,111 B2 * | 4/2012 | Sharma | G06F 13/4063 370/366 |
| 8,612,713 B2 | 12/2013 | Kim et al. | |
| 8,743,610 B2 | 6/2014 | Kim et al. | |
| 9,230,654 B2 | 1/2016 | Kim et al. | |
| 9,379,824 B2 * | 6/2016 | Choi | H04B 10/801 |
| 9,722,702 B2 * | 8/2017 | Choi | H04B 10/5161 |

(Continued)

FOREIGN PATENT DOCUMENTS

| | | |
|---|---|---|
| KR | 10-1154148 B1 | 6/2012 |
| KR | 10-1476515 B1 | 12/2014 |

*Primary Examiner* — Tammara R Peyton

(57) ABSTRACT

A memory interface apparatus is provided. The apparatus includes a central processing unit (CPU)-side protocol processor connected to a CPU through a parallel interface and a memory-side protocol processor connected to a memory through a parallel interface, and the CPU-side protocol processor and the memory-side protocol processor are connected through a serial link.

12 Claims, 6 Drawing Sheets

(56) References Cited

U.S. PATENT DOCUMENTS

2006/0149870 A1\* 7/2006 Sears .................... G06F 13/385
710/71
2015/0180574 A1 6/2015 Choi et al.

\* cited by examiner

MEMORY EXPANSION APPARATUS INCLUDES CPU-SIDE PROTOCOL PROCESSOR CONNECTED THROUGH PARALLEL INTERFACE TO MEMORY-SIDE PROTOCOL PROCESSOR CONNECTED THROUGH SERIAL LINK

CROSS-REFERENCE TO RELATED APPLICATION

This application claims priority to and the benefit of Korean Patent Application No. 10-2016-0025224, filed on Mar. 2, 2016, the disclosure of which is incorporated herein by reference in its entirety.

BACKGROUND

1. Field of the Invention

The present invention relates to a memory interface apparatus, and more particularly, to a serial memory interface apparatus for memory expansion and shared memory access.

2. Discussion of Related Art

FIG. 1 is a block diagram of a general-purpose central processing unit (CPU) (10) according to a related art.

The general-purpose CPU (10) according to the related art includes one or more cores (11), individual core-dedicated caches (12) (generally referred to as L1 and L2), a shared cache (13) (generally referred to as L3), memory controllers (14), and an input/output (I/O) controller (15).

Since an area occupied by a memory interface is very large, at most two memory controllers (14) may generally be provided in consideration of a chip area.

Data exchange between the shared cache (13) and main memories (20) is performed in hardware, and an auxiliary memory is present in a form of a peripheral (30) under the I/O controller (15).

Here, using a virtual memory technique, physical memory areas may be present in both of main memories and an auxiliary memory, and when viewed from a software perspective, the virtual memory areas may be linearly and continuously present.

Further, an operating system is in charge of data exchange between the physical memory areas of the main memories and the auxiliary memory, and thus a software developer may program software as if the main memories were continuously present.

Meanwhile, a network device (e.g., Gigabit Ethernet, InfiniBand, and the like) is present in the form of the peripheral (30) under the I/O controller (15), and thus data exchange with another CPU may be performed through the network device.

Further, when a main memory dedicated to each CPU is used in another CPU, the CPU that dedicates the main memory and another CPU share and use the main memory by transceiving data using an operating system in a message passing method.

In this case, since a distributed shared memory technique is used by being implemented in software in order to maintain data consistency, the complexity of software is increased. Further, since an I/O is used for memory sharing, a delay time related to the memory sharing is also very long.

Meanwhile, as most I/O controllers (15) used for recent CPUs are serialized, a communication port/line printer terminal (COM/LPT) which is an existing serial bus is replaced by Universal Serial Bus (USB), a peripheral component interconnect (PCI) is replaced by a PCI Express, and a parallel advanced technology attachment (PATA) is replaced by a serial ATA (SATA). Further, an existing parallel signal such as a video graphics array (VGA), a digital visual interface (DVI), and the like, which is a signal used to transmit a display in a graphic processor, is also replaced by a serial interface such as a high-definition multimedia interface (HDMI), a display port, and the like.

However, specifically, since a memory interface part that is the greatest area occupied in the CPU requires a high bandwidth, serialization has not progressed and a method in which 100 to 200 parallel signal lines are used is used without change.

Therefore, a memory signal line acts as a critical factor when a flexible computer system is configured. Specifically, when several CPUs access a common memory area, a current system has to rely on an I/O interface having a slow speed, many access steps, and a complex processing rather than using a memory interface having a faster access speed.

In this regard, Korean Patent Application Publication No. 10-2005-0078691 (Title of the Invention: MEMORY CONTROLLER AND MEMORY MODULE USING A SERIAL INTERFACE) discloses a technique in which a serial interface method is used for a data transceiving operation between a memory controller and a memory module which are included in a personal computer and the like.

SUMMARY OF THE INVENTION

The present invention is directed to a memory interface apparatus in which a memory expansion interface having a small number of pins for external expansion is provided in a small area while maintaining an existing memory interface in an interface between a central processing unit (CPU) and a memory.

However, the scope of the present invention is not limited to the above-described object, and other objects may present.

According to an aspect of the present invention, there is provided a memory interface apparatus including a CPU-side protocol processor connected to a CPU through a parallel interface and a memory-side protocol processor connected to a memory through a parallel interface. In this case, the CPU-side protocol processor and the memory-side protocol processor are connected through a serial link.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
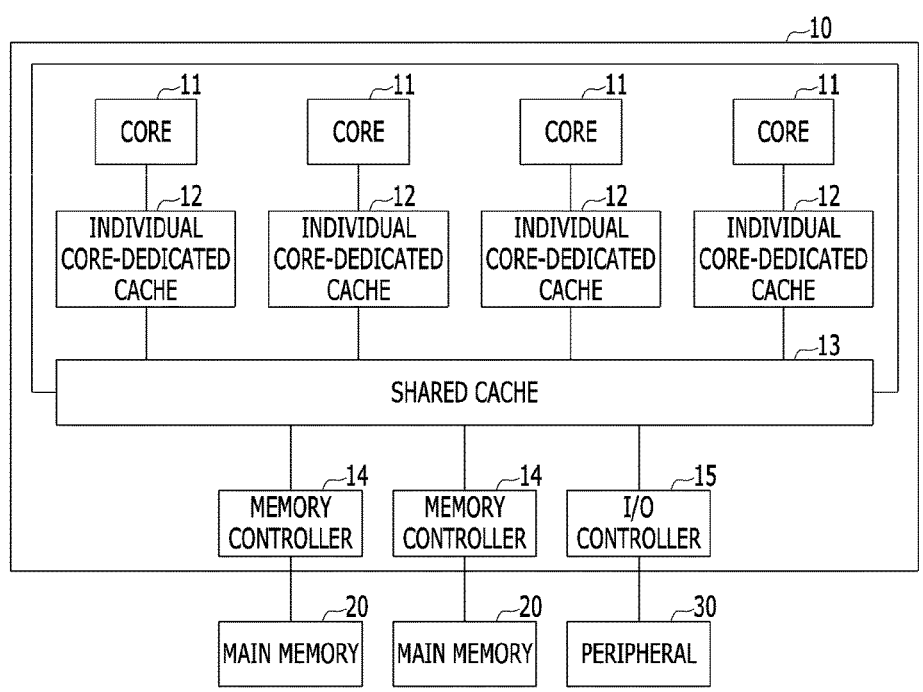
FIG. 1 is a block diagram of a general-purpose central processing unit (CPU) according to a related art.

Hereinafter, embodiments of the present invention that are easily performed by those skilled in the art will be described in detail with reference to the accompanying drawings. However, the present invention may be implemented in several different forms, and is not limited to embodiments described herein. In addition, parts irrelevant to a description are omitted in the drawings in order to clearly explain the present invention.

Throughout this specification, when a certain part "includes" a certain component, it means that another component may be further included not that another component is excluded unless otherwise defined.

Hereinafter, a memory interface apparatus according to one embodiment of the present invention will be described with reference to FIGS. 2 to 4.

Figure 2:
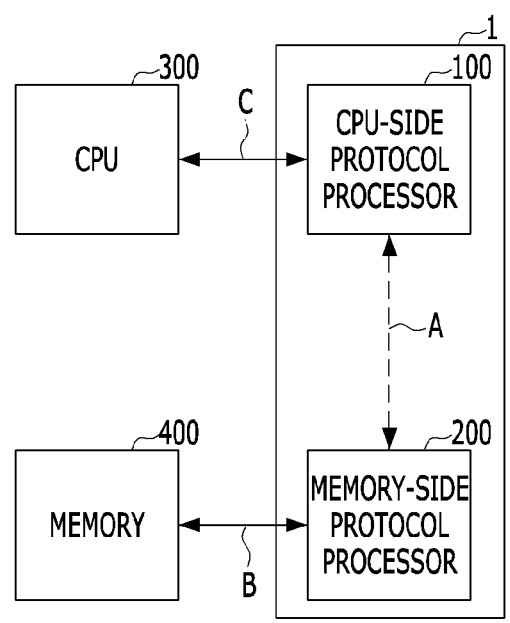
FIG. 2 is a block diagram of a memory interface apparatus according to one embodiment of the present invention.

FIG. 2 is a block diagram of a memory interface apparatus 1 according to one embodiment of the present invention. FIG. 3 is a block diagram of a central processing unit (CPU)-side protocol processor 100 according to one embodiment of the present invention. FIG. 4 is a block diagram of a memory-side protocol processor 200 according to one embodiment of the present invention.

As illustrated in FIG. 2, the memory interface apparatus 1 according to one embodiment of the present invention includes the CPU-side protocol processor 100 and the memory-side protocol processor 200.

The CPU-side protocol processor 100 is connected to a CPU 300 through a parallel interface b.

The memory-side protocol processor 200 is connected to a memory 400 through a parallel interface c. Here, a non-volatile storage unit, in which stored information is continuously maintained even without power supply, and a volatile storage unit are generally referred to as the memory 400.

For example, the memory 400 may include a NAND flash memory such as a compact flash (CF) card, a secure digital (SD) card, a memory stick, a solid-state drive (SSD), a micro SD card, and the like, a magnetic computer storage such as a hard disk drive (HDD) and the like, and an optical disc drive such as a compact disc read-only memory (CD-ROM), a digital versatile disc ROM (DVD-ROM), and the like.

The CPU-side protocol processor 100 and the memory-side protocol processor 200 are connected through a serial link a.

Figure 3:
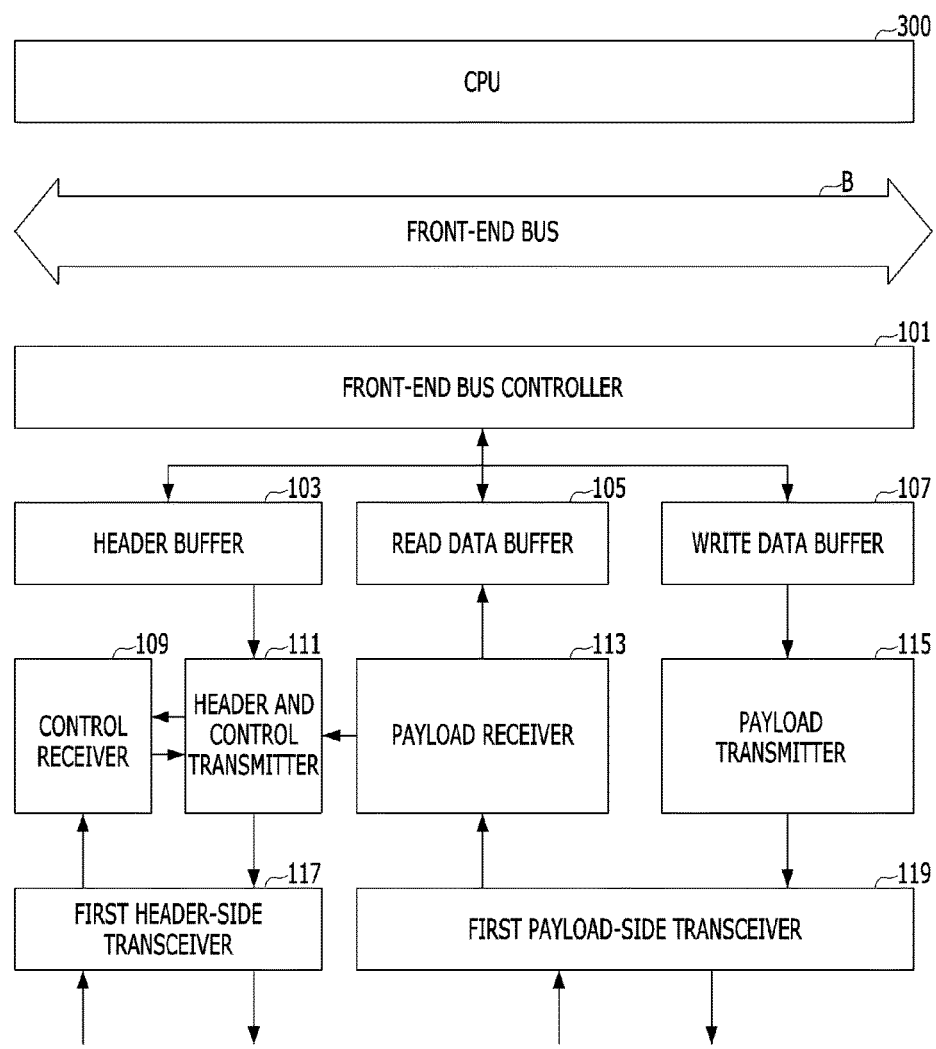
FIG. 3 is a block diagram of a CPU-side protocol processor according to one embodiment of the present invention.

Referring to FIG. 3, the CPU-side protocol processor 100 according to one embodiment of the present invention may include a front-end bus controller 101, a header buffer 103, a read data buffer 105, a write data buffer 107, a control receiver 109, a header and control transmitter 111, a payload receiver 113, a payload transmitter 115, a first header-side transceiver 117, and a first payload-side transceiver 119.

First, when the front-end bus controller 101 receives a front-end bus signal from the CPU 300, the front-end bus controller 101 generates a header packet for header processing and a write data payload packet for a data payload.

In this case, the generated header packet is stored in the header buffer 103 and the generated write data payload packet is stored in the write data buffer 107.

In this manner, in the memory interface apparatus 1 according to one embodiment of the present invention, a data transmission channel may be used only for data transmission by separating a header from a data structure. Accordingly, the header and a control channel may operate at a relatively low bandwidth, and thus may also operate as a transceiver having a low speed.

Specifically, the CPU-side protocol processor 100 may include the header buffer 103, the first header-side transceiver 117, the header and control transmitter 111, and the control receiver 109, and may transceive the header packet and a control packet with the memory-side protocol processor 200 through the above components.

The header and control transmitter 111 may transmit the header packet stored in the header buffer 103 to the memory-side protocol processor 200 through the first header-side transceiver 117. Also, the header and control transmitter 111 may transmit the control packet to the memory-side protocol processor 200 through the first header-side transceiver 117. Here, the control packet may include a physical packet for link setup and a link packet for flow control and data integrity.

The control receiver 109 may receive a control packet transmitted by the memory-side protocol processor 200 through the first header-side transceiver 117. Also, the control receiver 109 may inform the header and control transmitter 111 of a reception state of the control packet.

That is, the control receiver 109 may transmit information on whether or not the memory-side protocol processor 200 receives the header packet to the header and control transmitter 111 in response to receiving the control packet. Accordingly, when an error exists in a header packet received by the memory-side protocol processor 200, the header and control transmitter 111 may re-transmit the header packet to the memory-side protocol processor 200.

Meanwhile, the CPU-side protocol processor 100 may include the read data buffer 105, the write data buffer 107, the payload receiver 113, the payload transmitter 115, and the first payload-side transceiver 119.

The payload transmitter 115 includes a physical packet transmission function for link setup by default. Such a payload transmitter 115 may transmit the write data payload packet stored in the write data buffer 107 to the memory-side protocol processor 200 through the first payload-side transceiver 119 without the header packet.

Also, when an error exists in the write data payload packet transmitted by the payload transmitter 115, the payload transmitter 115 may receive information on the error from the control receiver 109. Accordingly, the payload transmitter 115 may re-transmit the write data payload packet in which the error occurs.

The payload receiver 113 includes a physical packet receiving function for link setup by default. Such a payload receiver 113 receives a read data payload packet transmitted by the memory-side protocol processor 200 from the first payload-side transceiver 119. Also, the payload receiver 113 stores the received read data payload packet in the read data buffer 105.

In this manner, the front-end bus controller 101 may read the read data payload packet stored in the read data buffer 105 and transmit the read data payload packet to the CPU 300 through a front-end bus b.

Meanwhile, the front-end bus controller 101 may detect whether or not an error exists in the read data payload packet and transmit a detection result to the header and control transmitter 111. Accordingly, the header and control transmitter 111 may request a re-transmission of the read data payload packet from the memory-side protocol processor 200.

Figure 4:
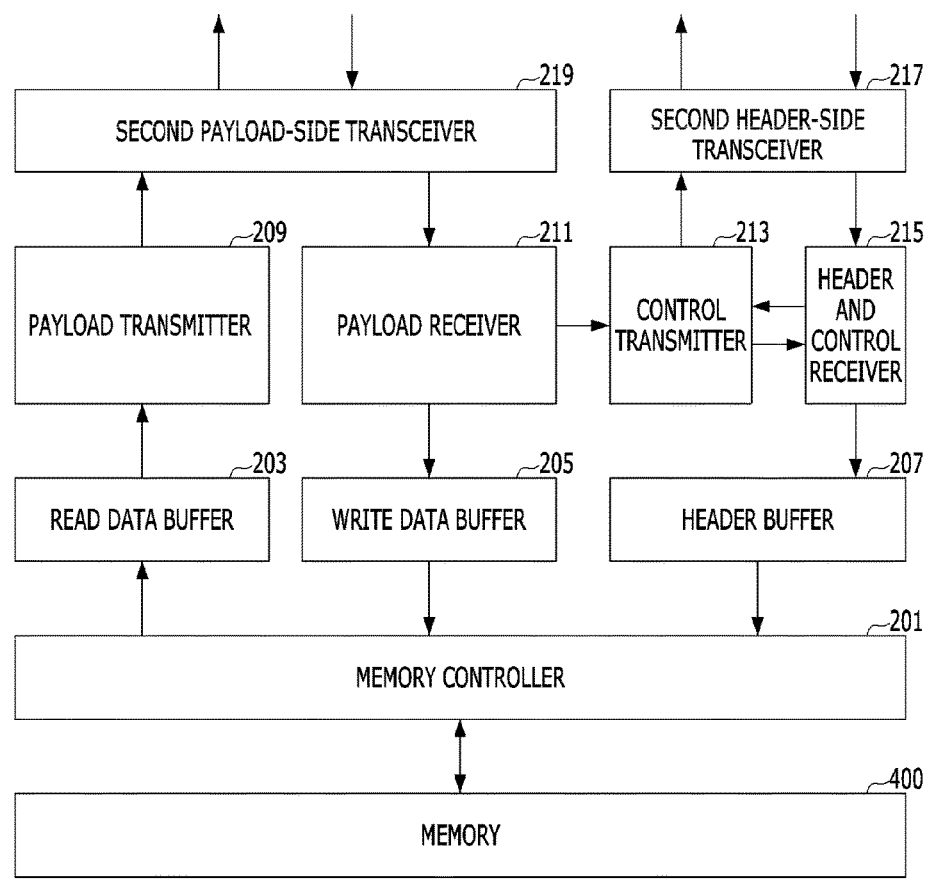
FIG. 4 is a block diagram of a memory-side protocol processor according to one embodiment of the present invention.

Next, as illustrated in FIG. 4, the memory-side protocol processor 200 according to one embodiment of the present invention includes a memory controller 201, a read data buffer 203, a write data buffer 205, a header buffer 207, a payload transmitter 209, a payload receiver 211, a control transmitter 213, a header and the control receiver 215, a second header-side transceiver 217, and a second payload-side transceiver 219.

In this case, the memory-side protocol processor 200 according to one embodiment of the present invention includes transceivers 217 and 219 divided into a header and a payload (e.g., 10 to 25 Gbps of gigabit transceivers) similar to the CPU-side protocol processor 100 illustrated in FIG. 3. The memory-side protocol processor 200 may receive a header packet and a write data payload packet through the respective transceivers 217 and 219 and store the header packet and the write data payload packet in the respective header buffer 207 and write data buffer 205.

Further, when an error is detected in the header packet or the data packet like in the CPU-side protocol processor 100, the memory-side protocol processor 200 may inform the control transmitter 213 of the error and thus the header packet or the data packet may be re-transmitted from the CPU-side protocol processor 100.

Specifically, the control transmitter 213 may transmit a control packet to the CPU-side protocol processor 100 through the second header-side transceiver 217. Here the control packet may include a physical packet for link setup and a link packet for flow control and data integrity like in the CPU-side protocol processor.

The header and the control receiver 215 may receive a header packet transmitted by the CPU-side protocol processor 100 through the second header-side transceiver 217 and store the header packet in the header buffer 207. Also, the header and the control receiver 215 may also receive a control packet transmitted by the CPU-side protocol processor 100.

Meanwhile, when a write operation needs to be performed in the memory 400, the payload receiver 211 of the memory-side protocol processor 200 receives a write data payload packet transmitted by the CPU-side protocol processor 100 through the second payload-side transceiver 219 and stores the write data payload packet in the write data buffer 205.

Accordingly, the memory controller 201 may perform the write operation in the memory 400 on the basis of address information of the header packet stored in the header buffer 207 and the write data payload packet stored in the write data buffer 205.

Further, when a read operation needs to be performed on the memory 400, the memory controller 201 performs the read operation on the memory 400 on the basis of the address information of the header packet stored in the header buffer 207. Also, the memory controller 201 may store a read data payload packet which is read according to the read operation in the read data buffer 203.

Accordingly, the payload transmitter 209 may transmit the read data payload packet stored in the read data buffer 203 to the CPU-side protocol processor 100 through the second payload-side transceiver 219.

Meanwhile, when an error exists in the read data payload packet transmitted by the payload transmitter 209, the payload transmitter 209 may receive information on the error from the header and control receiver 215. Accordingly, the payload transmitter 209 may ensure data integrity by re-transmitting the read data payload packet to the CPU-side protocol processor 100.

For reference, the components according to one embodiments of the present invention illustrated in FIGS. 2 to 4 may be implemented in a software form or a hardware form such as a field programmable gate array (FPGA) or an application specific integrated circuit (ASIC), and may perform predetermined roles.

However, the components are not limited to software or hardware. Each component may be included in a recording medium that may address the component or may be formed to be executed by at least one processor.

Therefore, examples of the components may include components such as software components, object-oriented software components, class components, and task components, processes, functions, properties, procedures, subroutines, segments in program codes, drivers, firmware, microcode, circuits, data, databases, data structures, tables, arrays, and parameters.

Components and functions provided from corresponding components may be combined by a smaller number of components or may be further separated into additional components.

Hereinafter, an example to which a memory interface apparatus according to one embodiment of the present invention is applied will be described with reference to FIGS. 5 to 8.

Figure 5:
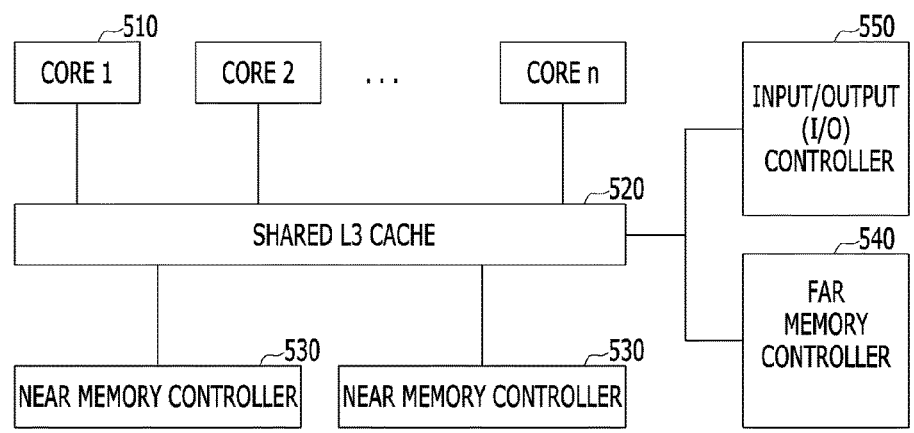
FIG. 5 is a diagram of an exemplary memory expansion interface in a computer system to which one embodiment of the present invention is applied.

FIG. 5 is a diagram of an exemplary memory expansion interface in a computer system to which one embodiment of the present invention is applied.

The computer system to which the memory interface apparatus according to one embodiment of the present invention is applied may provide a memory expansion interface having a small number of pins for external expansion in a small area in an interface between a CPU and a memory as illustrated in FIG. 5.

In FIG. 5, a near memory controller 530, which is an existing memory interface that is an interface that may be connected to a double data rate type three (DDR3) or a DDR type four (DDR4), may include about 200 pins, and may generally include two sets of pins.

An I/O controller 550 is an existing I/O interface which controls a peripheral component interconnect express (PCIe), Universal Serial Bus (USB), Ethernet, and the like.

A far memory controller 540 may correspond to the CPU-side protocol processor in the present invention, and may connect an external DDR3 or DDR4 with 4 to 40 pins.

The memory expansion interface configured in this manner may be used to exchange data between CPUs when the memory expansion interface is connected to an external shared memory as well as increase the number of memories that are simply available in a single processor. Also, a process synchronization architecture configuration such as a test-and-set, a semaphore, and the like that may be in hardware may be used in the shared memory, and thus memory consistency between the CPUs may be ensured.

Figure 6:
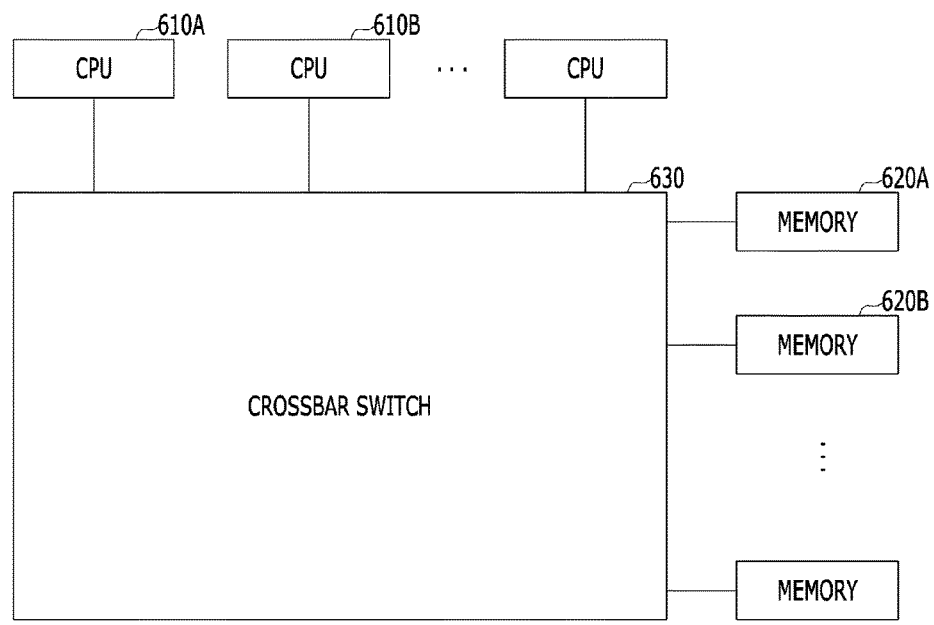
FIG. 6 is a diagram of an exemplary configuration in which a plurality of CPUs are connected to a shared memory while being used for shared memory access.

FIG. 6 is a diagram of an exemplary configuration in which a plurality of CPUs are connected to a shared memory while being used for shared memory access.

In a case of a related art, an interface between a CPU and a memory includes only 100 or more pure signal lines. Accordingly, it is very complicated to make a crossbar switch using the related art, and it is impossible to physically make the crossbar switch due to a combination of many problems such as a skew problem between signals, an area problem, a heating problem, and the like.

However, in one embodiment of the present invention, since a far memory interface is formed using a serial method and a packet switching method, such a crossbar switch 630 is relatively and easily made.

In an interface to which a memory interface apparatus according to one embodiment of the present invention is applied, since a minimal configuration thereof is possible with four pins (Tx/Rx and differential pairs), the configuration of the crossbar switch 630 may be significantly simplified when a minimal configuration is used.

The crossbar switch 630 makes a field apply a mechanism in which a critical region may be fixed in a constituting packet in order to ensure memory consistency. A mechanism may also be applied so that another CPU 610*b* may wait for accessing to an identical memory 620 when any one CPU 610*a* accesses to a memory 620*a* using the field made in this manner. Such a mechanism may be implemented using the above-described test-and-set, semaphore, or the like.

In this case, a memory access time is expected to be about 250 ns due to serialization protocol processing and a transmission channel delay, and is ten times longer than 25 ns which is a DDR memory access time. However, since the memory access time is 400 times faster than that of an SSD access time announced recently from Intel Corporation and a cache miss rate of L3 is significantly low (currently, below 10%), such a degree of delay time allows a user to feel a very fast speed.

Further, the serialization of the memory access channel may have a reach distance of about 90 cm when using an electrical signal, but may have a sufficient reach distance of 50 m (multimode fiber (MMF)) to 1 km (single mode fiber (SMF)) when using an additional optical transceiver or the like.

In addition, a data integrity algorithm is applied to the far memory controller which is one embodiment of the present invention, and thus a safer data transceiving performance may be ensured.

Figure 7:
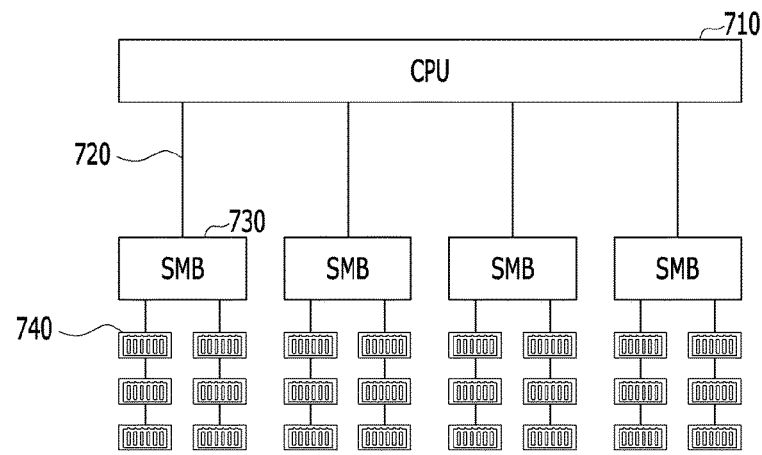
FIG. 7 is a diagram illustrating a structure of a server processor.
Figure 8:
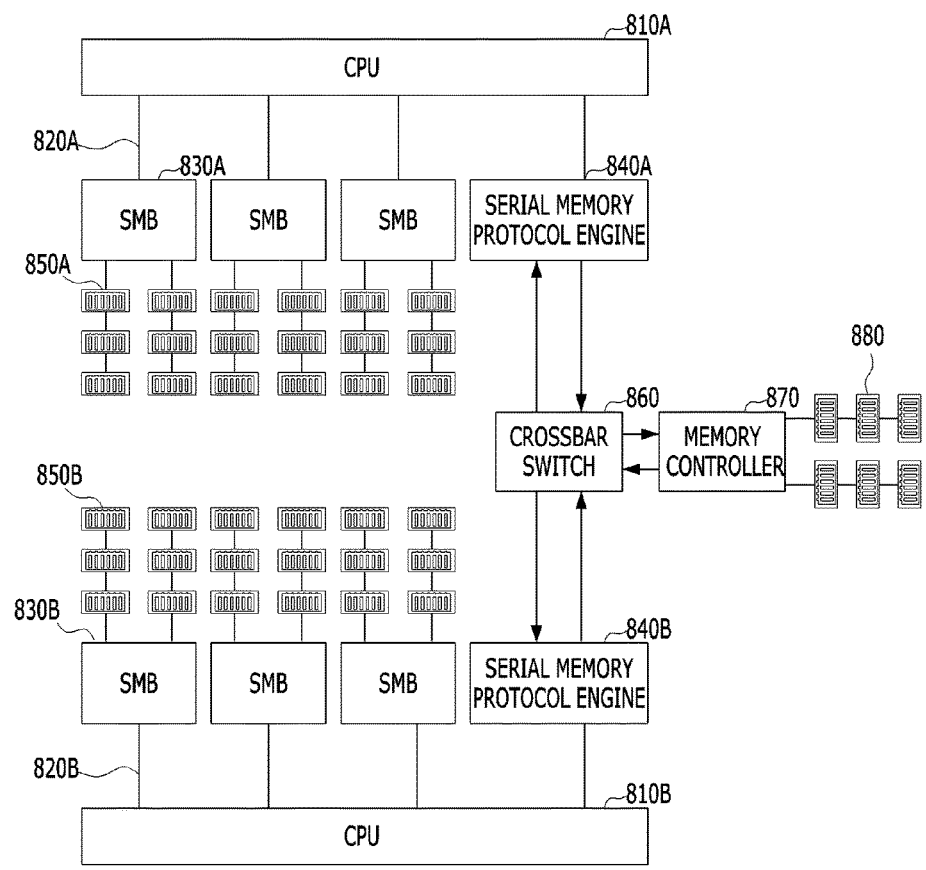
FIG. 8 is a diagram of an exemplary memory interface apparatus according to one embodiment of the present invention applied to a server processor.

FIG. 7 is a diagram illustrating a structure of a server processor. FIG. 8 is a diagram of an exemplary memory interface apparatus according to one embodiment of the present invention applied to a server processor.

As described in FIGS. 5 and 6, the memory interface apparatus 1 according to one embodiment of the present invention may be applied without changing a shape of a CPU 710 in addition to a method of applying the memory interface apparatus 1 into the CPU 710.

As illustrated in FIG. 7, in the server processor, scalable memory interfaces (SMIs) 720 which are separate interfaces are provided instead of embedded memory controllers directly connected to memories 740, and a method of connecting the SMIs to the memories 740 using scalable memory buffers (SMBs) 730 is used. Memory channels may extend through the SMBs 730.

The memory interface apparatus 1 according to one embodiment of the present invention is more appropriate in a server that requires more memories than a personal desktop computer. As illustrated in FIG. 8, in the server processor, when using SMIs 820*a* and 820*b*, SMB chipsets 830*a* and 830*b* may be manufactured without changing structures of CPUs 810*a* and 810*b*, and thus a memory expansion structure and a shared memory configuration may be provided.

For example, a structure in which the two CPUs 810*a* and 810*b* may access shared memories 880 is illustrated in FIG. 8, but a serial line is very excellent in flexibility and connectivity, and one embodiment of the present invention may also be implemented in a structure in which all of a desired number of CPUs may be connected.

According to the above-described embodiment of the present invention, a serial memory access structure for memory expansion of the CPUs may be provided.

Further, when the above-described embodiment of the present invention is applied to a server structure, accessing a shared memory by a large number of CPUs may be easy, and the server structure may have better performance than when a shared memory is accessed using an I/O.

Further, since software layers for memory access are also very simple, high performance may be maintained.

The method to which the memory interface apparatus according to one embodiment of the present invention is applied may be implemented in a form of a computer program stored in a medium, which is executed by a computer, or in a form of a recording medium including instructions that may be executed by a computer. A computer-readable medium may be any available medium that may be accessed by a computer, and includes all of a volatile medium, a non-volatile medium, a removable medium, and a non-removable medium. Further, the computer-readable medium may include both of a computer storage medium and a communication medium. The computer storage medium includes all of a volatile medium, a non-volatile medium, a removable medium, and a non-removable medium, which are implemented by any method or technique for storing information such as a computer-readable instruction, a data structure, a program module, or various types of data. The communication medium typically includes a computer-readable instruction, a data structure, a program module, various types of data of a modulated data signal such as a carrier wave, or various types of transmission mechanisms, and includes any information delivery medium.

Although the method and the system in the present invention are described with reference to specific embodiments, components or some or all of operations thereof may be implemented using a computer system having a general-purpose hardware architecture.

The above description of the invention is only exemplary, and it should be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims, and encompasses all modifications or alterations derived from meanings, and the scope and equivalents of the appended claims.

What is claimed is:

1. A memory interface apparatus, comprising:
   a central processing unit (CPU)-side protocol processor connected to a CPU through a parallel interface; and
   a memory-side protocol processor connected to a memory through a parallel interface,
   wherein the CPU-side protocol processor and the memory-side protocol processor are connected through a serial link, and
   wherein the CPU-side protocol processor includes:

a front-end bus controller configured to generate a header packet for header processing and a write data payload packet for a data payload;
a header buffer configured to store the header packet; and
a write data buffer configured to store the write data payload packet.

2. The apparatus of claim 1, wherein the CPU-side protocol processor further includes:
a first header-side transceiver;
a header and control transmitter configured to transmit the stored header packet and a control packet to the memory-side protocol processor through the first header-side transceiver; and
a control receiver configured to receive the control packet from the memory-side protocol processor through the first header-side transceiver,
wherein the control packet includes a physical packet for link setup and a link packet for flow control and data integrity.

3. The apparatus of claim 2, wherein:
the control receiver transmits information on whether or not the memory-side protocol processor receives the header packet to the header and control transmitter in response to receiving the control packet; and
the header and control transmitter re-transmits the header packet when an error exists in the header packet.

4. The apparatus of claim 2, wherein the CPU-side protocol processor further includes:
a first payload-side transceiver; and
a payload transmitter configured to transmit the write data payload packet stored in the write data buffer to the memory-side protocol processor through the first payload-side transceiver.

5. The apparatus of claim 4, wherein, when an error exists in the write data payload packet transmitted by the payload transmitter, the payload transmitter receives information on the error from the control receiver and re-transmits the write data payload packet.

6. The apparatus of claim 4, wherein the CPU-side protocol processor further includes:
a read data buffer configured to store a read data payload packet; and
a payload receiver configured to receive the read data payload packet, which is transmitted from the first payload-side transceiver by the memory-side protocol processor, and store the read data payload packet in the read data buffer,
wherein the front-end bus controller transmits the read data payload packet stored in the read data buffer to the CPU.

7. The apparatus of claim 6, wherein:
the front-end bus controller transmits whether or not an error exists in the read data payload packet to the header and control transmitter; and
the header and control transmitter requests re-transmission of the read data payload packet from the memory-side protocol processor.

8. A memory interface apparatus, comprising:
a central processing unit (CPU)-side protocol processor connected to a CPU through a parallel interface; and
a memory-side protocol processor connected to a memory through a parallel interface,
wherein the CPU-side protocol processor and the memory-side protocol processor are connected through a serial link, and
wherein the memory-side protocol processor includes:
a header buffer configured to store a header packet transmitted by the CPU-side protocol processor;
a write data buffer configured to store a write data payload packet transmitted by the CPU-side protocol processor; and
a memory controller configured to perform a write operation and a read operation on the memory.

9. The apparatus of claim 8, wherein the memory-side protocol processor further includes:
a second header-side transceiver;
a control transmitter configured to transmit a control packet to the CPU-side protocol processor through the second header-side transceiver; and
a header and the control receiver configured to receive the header packet and the control packet, which are transmitted by the CPU-side protocol processor through the second header-side transceiver, and store the header packet in the header buffer,
wherein the control packet includes a physical packet for link setup and a link packet for flow control and data integrity.

10. The apparatus of claim 8, wherein the memory-side protocol processor further includes:
a second payload-side transceiver; and
a payload receiver configured to receive the write data payload packet, which is transmitted by the CPU-side protocol processor through the second payload-side transceiver, and store the write data payload packet in the write data buffer,
wherein the memory controller performs the write operation on the memory on the basis of address information of the header packet stored in the header buffer and the write data payload packet stored in the write data buffer.

11. The apparatus of claim 10, wherein the memory-side protocol processor further includes:
a read data buffer configured to store a read data payload packet read from the memory; and
a payload transmitter configured to transmit the read data payload packet to the CPU-side protocol processor through the second payload-side transceiver,
wherein the memory controller performs the read operation on the memory on the basis of the address information of the header packet stored in the header buffer and stores the read data payload packet which is read according to the read operation in the read data buffer.

12. The apparatus of claim 11, wherein, when an error exists in the read data payload packet transmitted by the payload transmitter, the payload transmitter receives information on the error from the header and control receiver and re-transmits the read data payload packet.

* * * * *